United States Patent [19]
VanDyke

[11] Patent Number: 5,705,922
[45] Date of Patent: Jan. 6, 1998

[54] TERMINATOR WITH VOLTAGE REGULATOR

[75] Inventor: Jason VanDyke, Gettysburg, Pa.

[73] Assignee: The Whitaker Corporation, Wilmington, Del.

[21] Appl. No.: 413,303

[22] Filed: Mar. 30, 1995

[51] Int. Cl.$^6$ ...................................... H01R 4/24
[52] U.S. Cl. ............................................ 323/354
[58] Field of Search ...................... 323/352, 353, 323/354; 439/389–425; 333/117–123, 160–161; 455/325–327; 327/277, 269, 276, 337; 326/30

[56] References Cited

U.S. PATENT DOCUMENTS

| | | | |
|---|---|---|---|
| 4,058,759 | 11/1977 | Halfhill | 322/13 |
| 4,063,147 | 12/1977 | Hatanaka et al. | 323/22 Z |
| 4,217,538 | 8/1980 | Ziemacki | 322/29 |
| 4,262,242 | 4/1981 | Glennon | 322/28 |
| 4,291,286 | 9/1981 | Wagner | 333/166 |
| 4,310,816 | 1/1982 | Fuller | 333/156 |
| 4,323,863 | 4/1982 | Weber | 333/109 |
| 4,354,168 | 10/1982 | Fay | 333/156 |
| 4,398,161 | 8/1983 | Lamb et al. | 333/156 |
| 4,737,703 | 4/1988 | Hayakawa | 323/213 |
| 4,968,928 | 11/1990 | Heider | 323/275 |
| 4,992,761 | 2/1991 | Seely et al. | 333/118 |
| 5,239,559 | 8/1993 | Brach et al. | 375/36 |
| 5,362,991 | 11/1994 | Samela | 327/540 |

OTHER PUBLICATIONS

International Search Report, PCT/US96/02521 (two pages); Jun. 19, 1996.

*Elektor Dec. 1993*, "Rausch–und Störfrei Messen", Carr; Dec. 1993; 9no translation available).

*SCSI Proposed Standard X3T9.2 885D, Revision 12b*, "SCSI-3 Parallel Interface", 75 pages; Jun. 21, 1993; American National Standard of Accredited Standards Committe X3.

*Primary Examiner*—Aditya Krishnan
*Attorney, Agent, or Firm*—Anton P. Ness

[57] ABSTRACT

A line terminator (1) having a circuit board (8) with at least three circuits, and including a voltage regulator (2) combined with a voltage divider circuit and a noise reduction circuit path (17). The noise reduction circuit path (17) is coupled to two spaced apart high frequency capacitors (28a,28b), and the noise reduction path is apportioned to extend equally between the pair of spaced apart capacitors (28a,29b) and generally circumscribe the remaining circuits of the circuit board (8).

21 Claims, 4 Drawing Sheets

5,705,922

1

TERMINATOR WITH VOLTAGE REGULATOR

FIELD OF THE INVENTION

The invention relates to a line terminator, and, more particularly, to a line terminator having an electronic voltage regulator with an improvement in noise reduction.

BACKGROUND OF THE INVENTION

A line terminator operates as specified by SCSI, III Standard X3T9.2/855D, Revision 12B. The terminator includes a voltage regulator of semiconductor construction that is available from a manufacturer as an item of commerce. The purpose of the voltage regulator is to provide a source of voltage at a nominal value, within controlled limits of variation from the nominal value. The voltage regulator is a circuit component combined with other circuit components of an electronic circuit on a circuit board. A circuit designer selects the manufacturer to supply a voltage regulator that is compatible with the circuit that is being designed by the circuit designer. The voltage regulator is supplied as a semiconductor package having multiple electrical leads. These electrical leads are soldered to conducting pads or conducting paths on an outer side of a circuit board. The semiconductor package provides an integrated circuit that integrates the voltage regulator with auxiliary electronic circuits having auxiliary functions. For example, the integrated circuit is constructed with circuit components having the functions of, current limiting and thermal limiting, which protect the voltage regulator from damage.

A primary problem faced by a circuit designer is caused by the presence of unwanted noise, in the form of unwanted voltage spikes and various low level voltage fluctuations. This noise is induced by emanating electrical energy. The electrical energy is transmitted, either by radiation through the air, or by transmission along the circuit from the electrical components while they operate. The circuit is inherently inductive, which allows the unwanted electrical energy to induce the unwanted voltage fluctuations in the circuit. One technique for combatting the noise, is to combine the voltage regulator with a noise reduction circuit. The noise reduction circuit is designed by the circuit designer, and is coupled to selected electrical leads on the voltage regulator. For example, a noise reduction circuit utilizes a capacitor to compensate for inherent inductance of the circuit. However, a demand exists for voltage regulators with more closely confined limits of nominal voltage, which renders less effective the use of a capacitor for noise reduction.

SUMMARY OF THE INVENTION

The invention resides in a line terminator comprising a voltage regulator combined with a voltage divider circuit and a noise reduction circuit path in which noise reduction on the circuit path is apportioned along the entire length of the circuit path.

An embodiment resides in a line terminator comprising a voltage regulator combined with a voltage divider circuit and a noise reduction circuit constructed with a circuit path in which noise reduction on the circuit path is apportioned to extend equally between a pair of spaced apart high frequency capacitors.

An embodiment comprises a voltage regulator, and a voltage divider circuit on a circuit board, both coupled to an input circuit path for supplying input voltage, wherein the input circuit path has a path length extending on the circuit

2 board that is apportioned to extend equally between a pair of spaced apart low frequency capacitors.

DETAILED DESCRIPTION

Figure 2:
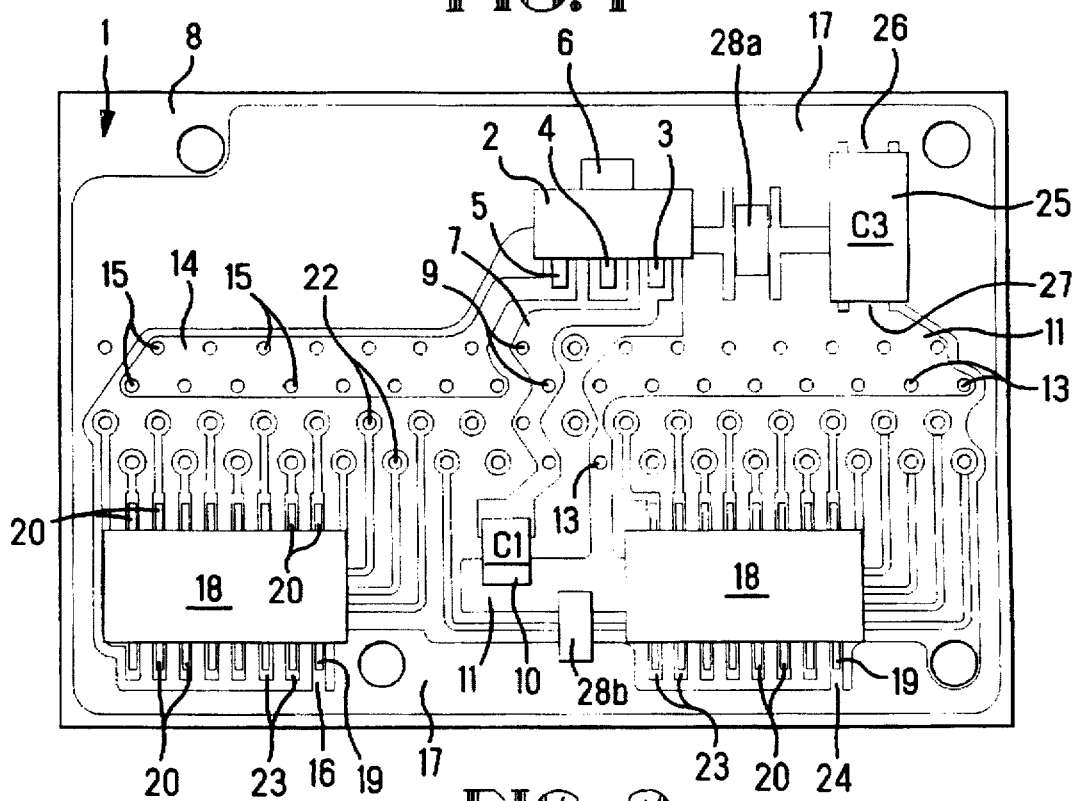
FIG. 2 is a view similar to FIG. 1, illustrating circuit components mounted on the circuit board and connected electrically to the circuits.
Figure 6:
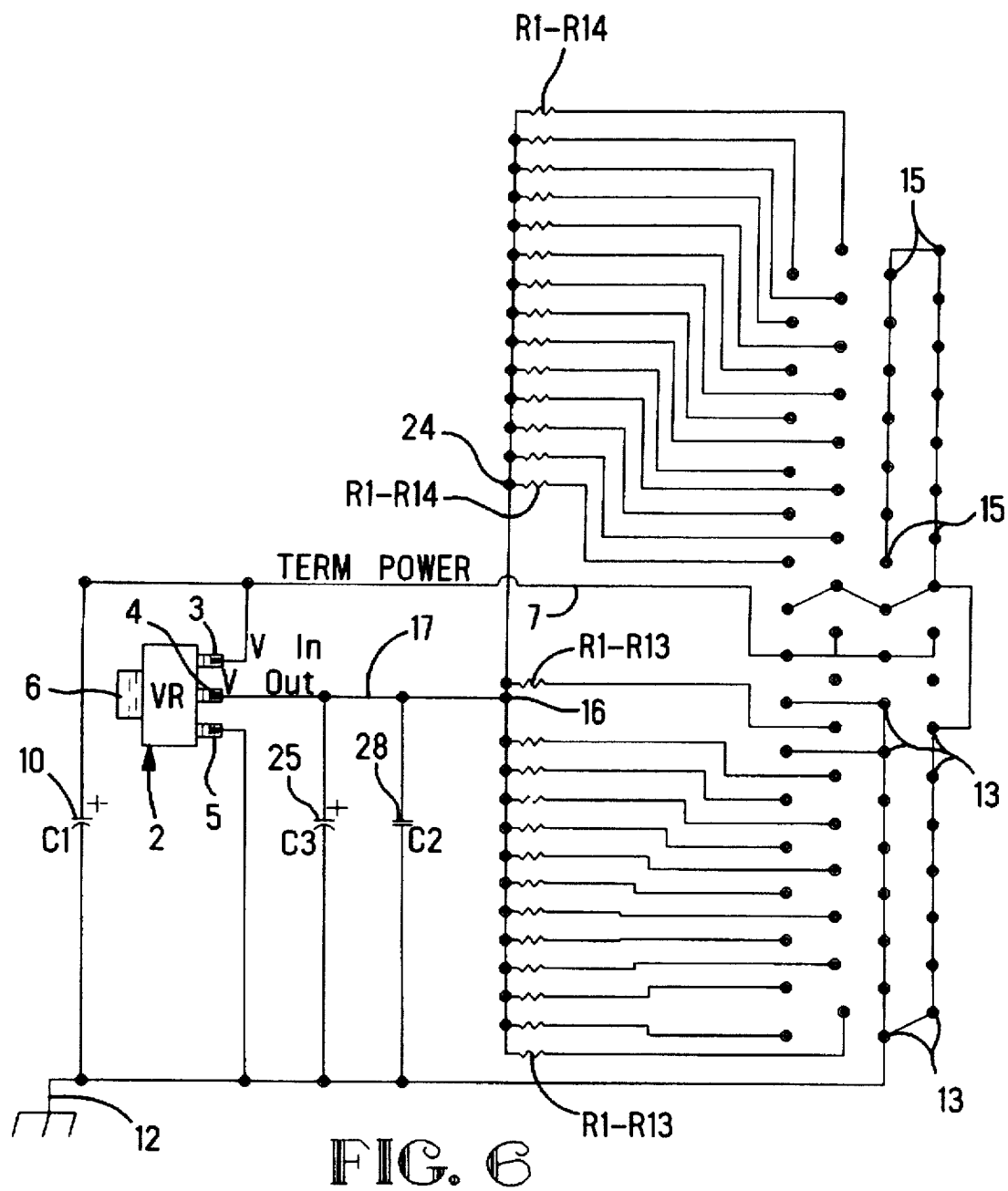
FIG. 6 is a schematic view of an electrical circuit provided by the structure shown in FIG. 2.

With reference to FIGS. 2 and 6, an electrical line terminator 1, FIG. 2, is constructed as an electrical circuit to correspond with the schematic circuit shown in FIG. 6. A voltage regulator 2 comprises an integrated circuit of semiconductor construction having four electrical leads 3, 4, 5, 6. For example, the voltage regulator 2 is commercially available as part number REG1117-2.85 from the manufacturer, Burr-Brown Co., Tucson, Ariz. An alternate source of supply is identified as part number LT1117CST-2.85 from Linear Technology, Mulpitas, Calif. The terminal 3 of the voltage regulator 2 is referenced at a voltage V-in in the schematic view of FIG. 6. The terminal 3 is connected to a conducting circuit path 7 on a circuit board 8 that connects to four plating lined holes 9 through the circuit board 8.

With reference to FIG. 2, a noise reduction capacitor C1, 10 is connected on a wide, enlarged circuit path 11 between input term power and ground at 12, or earth electrical potential. For example, Capacitor C1 is commercially available as part number 293D475X0016B2T, from Sprague Electric Company, Sanford Me., rated at 16 Volts DC, having a capacitance of 4.7 microFarads.

In FIG. 2, the circuit path 11 extends from C1 to connect with fifteen plating lined holes 13 through the circuit board 8. The plating lined holes 13 are referenced to ground at 12. The lead 5 on the voltage regulator 2 is connected, FIG. 2, to a wide, enlarged circuit path 14 referenced to ground at 12. The circuit path 14 is connected to fifteen plating lined holes 15 through the circuit board 8. The plating lined holes 15 are referenced to ground at 12.

With reference to FIG. 6, thirteen, multiple resistors R1–R13 are bussed, or connected, to a single electrical circuit pad or path 16. With reference to FIG. 2, the electrical pad 16 is on a conductive circuit path 17, and is referenced to a voltage V-out, FIG. 6, which is the output voltage of the voltage regulator. The output voltage is at a nominal value within controlled limits of the nominal value. A requirement of the terminator 1 is to reduce unwanted noise in the circuit path 17. The presence of unwanted noise will cause unwanted variations in the output voltage, V-out. A feature of the embodiment resides in the circuit path 17 circumscribing the remainder of the circuit that comprises the terminator 1, to shield the circuit from emanating electrical energy, and then providing for noise reduction on the circuit path 17, in a manner to be described, hereafter.

Figure 1:
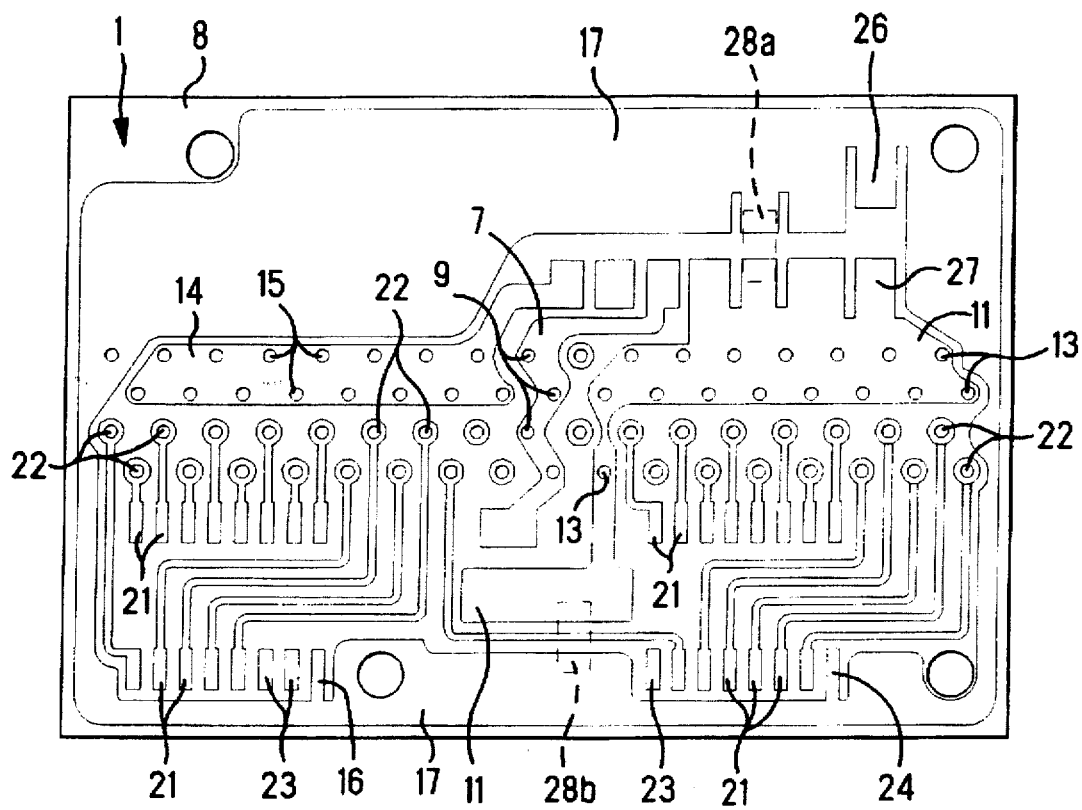
FIG. 1 is a plan view of one side of a circuit board illustrating linear circuits.

A first resistor network 18, FIG. 2, comprises a package containing the multiple resistors R1–R13. The resistors within the resistor network 18 each are connected between, a single electrical lead 19 on the resistor network 18, and respective, fifteen electrical leads 20. Thirteen of the electrical leads 20 are connected by respective circuit paths 21, FIG. 1, to respective plating lined holes 22 through the circuit board 8. FIG. 1 also illustrates two circuit paths 23 that are unused, whereby, two resistors within the resistor network 18 are unused when they are connected by the respective leads 20 to the respective circuit paths 23.

With reference to FIG. 6, fourteen multiple resistors R1–R14 are bussed, or connected, to a single electrical circuit pad or path 24. With reference to FIG. 2, the pad 24 is on the conductive circuit path 17 referenced to the voltage V-out. The circuit path 17 is near the periphery of the circuit board 8, and substantially circumscribes the periphery of the circuit board 8. A second resistor network 18, FIG. 2, comprises a package containing the multiple resistors R1–R14, and is identical in construction to the first resistor network 18. The resistors within the second resistor network 18 each are connected between, a single electrical lead 19 on the second resistor network 18, and respective, fifteen electrical leads 20. Fourteen of the electrical leads 20 are connected by respective circuit paths 21, to respective, plating lines holes 22 through the circuit board 8. FIG. 1 also illustrates one circuit path 23 that is unused, whereby, one resistor within the second resistor network 18 is unused when it is connected by the respective lead 20 to the circuit path 23. The multiple resistors of the resistor networks 18, 18 comprise a voltage divider circuit coupled between V-out of the voltage regulator 2 and ground.

With reference to FIG. 2, on the voltage regulator 2, the electrical leads 4, 6 are connected together by the manufacturer. The leads 4, 6 are connected to the circuit path 17 that is referenced to the voltage V-out of the voltage regulator 2. With reference to FIGS. 2 and 6, a noise reducing low frequency capacitor C3, 25 is connected between V-out on the circuit path 17 and ground on the circuit path 11. With reference to FIG. 1, conductive pads, or paths, 26, 27 are on respective circuit paths 17, 11. The capacitor C3, 25 is connected to the pads 26, 27.

On the schematic view of FIG. 6, a noise reducing capacitor C2, 28 is connected between the voltage V-out and ground. With reference to FIG. 2, the capacitor C2 is divided into two capacitors 28a, 28b it being understood that the two high frequency capacitors 28a, 28b, combined, have the same electrical capacitance as the single capacitor C2, 28. Both capacitors 28a, 28b are connected between the circuit paths 17, 11.

With reference to FIGS. 1 and 2, because the circuit path 17 circumscribes the circuit board 8, it also circumscribes the remaining circuits and the components. The circuit path 17 provides a lengthy circuit path referenced at the voltage V-out. The circuit path 11, referenced to ground, extends along the circuit board 8 to extend toward opposite sides of the circuit path 17. The two capacitors, 28a, 28b, are connected to the ground circuit path 11. The two capacitors 8a, 28b are connected between ground potential and the opposite sides of the circuit path 17. A noise reduction circuit is constructed with the circuit path 17 circumscribing the remainder of the circuit paths on the circuit board 8. The path length of the circuit path 17 is apportioned to extend equally between the pair of spaced apart capacitors. The two capacitors 28a, 28b are spaced on opposite sides of the circumscribing along the circuit path 17 to distribute their noise reduction function along the circuit path 17. The noise reduction efficiency is increased as compared with using only the single capacitor C2, 28, as suggested by the schematic view of FIG. 6.

For example, capacitor C3 is commercially available as part number 293D226X0010C2T, from Sprague Technologies, Inc. Stamford, Conn., rated at 22 microFarads, at V-out. Each of the two high frequency capacitors C2, C2, 28a, 28b, is commercially available as part number 12065C104MAT, from AVX Corporation, Myrtle Beach, S.C., rated at 50 Volts DC, at V-out.

What has been described is a line terminator 1 comprising a voltage regulator circuit providing a voltage V-out, and a voltage divider circuit comprising the resistor networks 18, 18, and a noise reduction circuit to reduce noise on the lines, for example, the noise reduction circuit comprising the capacitor C1 on the input, term power line, and the capacitors C2 and C3 on the output voltage line V-out. The Capacitor C2 has a lower voltage rating to reduce noise from lower voltage spikes being induced on the output voltage line, V-out. The capacitor C3 has a higher voltage rating to reduce noise from higher voltage spikes being induced on the output voltage line, V-out.

Figure 7:
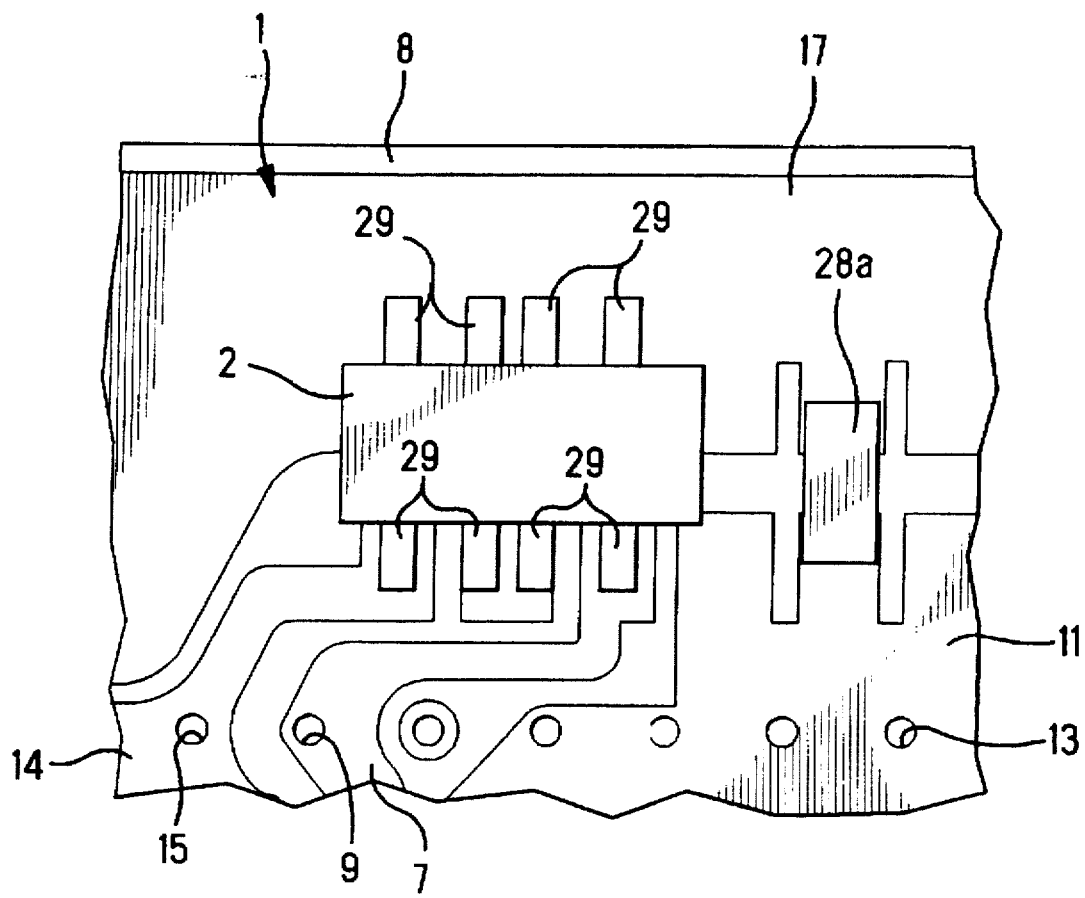
FIG. 7 is a fragmentary view of a portion of the circuit board as shown in FIG. 1, together with a voltage regulator.

FIG. 7 discloses an alternative voltage regulator that is commercially available, as part number MC34268D, from Motorola Semiconductor Products, Phoenix Ariz. This regulator has eight electric leads 29, with four leads 29 on one side of the regulator connected to the circuit path 17, and with one lead 29 connected to the circuit path 7, and with one lead 29 connected to the circuit path 14. The circuit paths 17, 7 and 14 are identical in both FIGS. 1 and 7.

Figure 3:
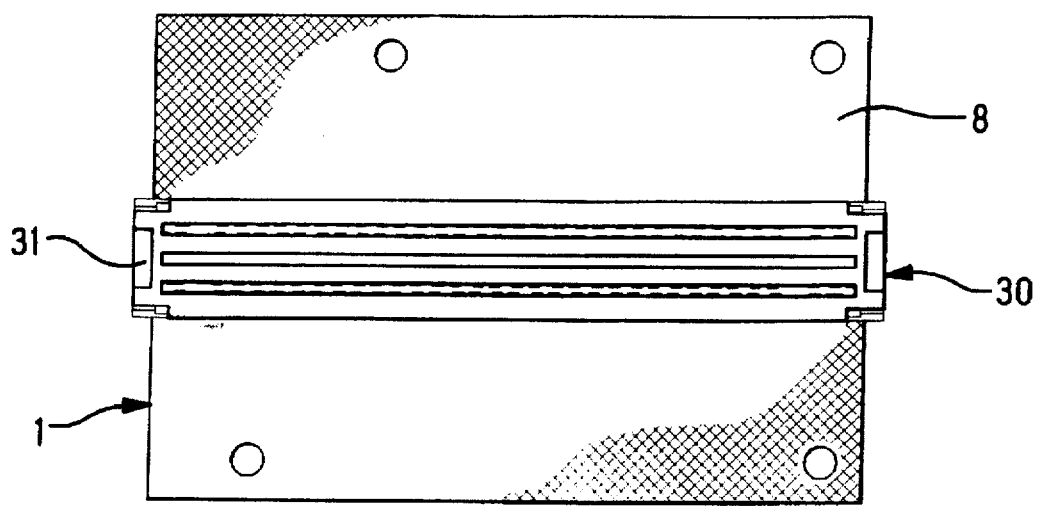
FIG. 3 is a bottom plan view of the circuit board shown in FIG. 1, together with an electrical connector.
Figure 4:
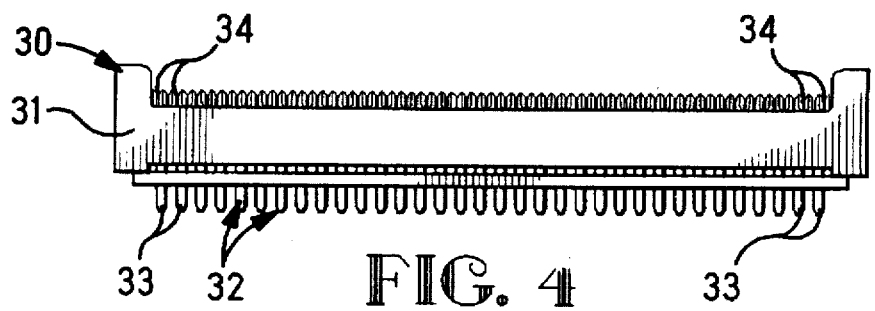
FIG. 4 is a side view of the electrical connector shown in FIG. 3, prior to mounting on the circuit board shown in FIG. 3.

FIGS. 3 and 4 disclose an electrical connector 30 for connection to a flat cable, not shown, comprising, an insulating housing 31 and four rows of conducting electrical contacts 32. The contacts 32 are constructed with projecting pins 33 arranged in four rows of pins, for plugging into respective plated through holes 13, 15, 22 that are also arranged in four rows of plated through holes. Opposite ends of the contacts 32 are insulation displacement contacts 34 for connection, in a manner disclosed in U.S. Pat. No. 5,122,079, to respective conductors of a flexible, flat electrical cable, not shown.

Figure 5:
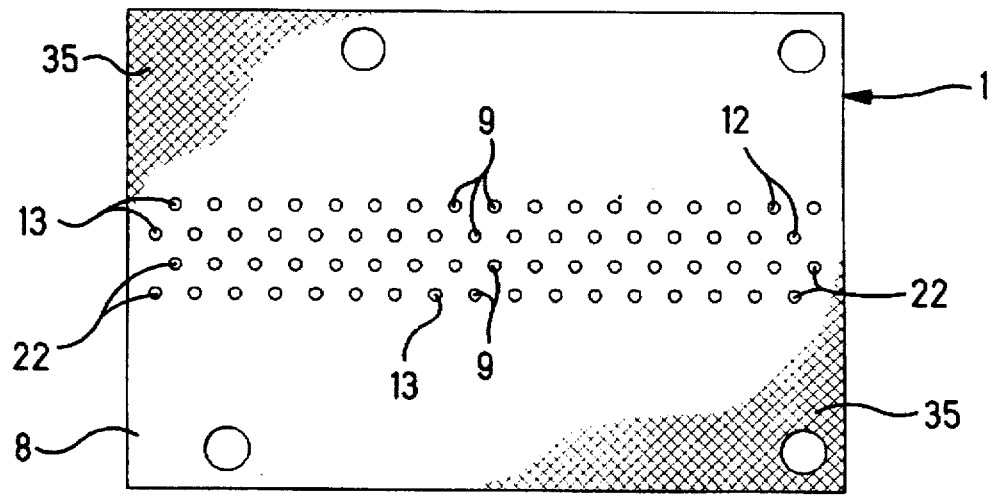
FIG. 5 is a view similar to FIG. 3, showing the circuit board without the connector.

FIG. 5 discloses a conductive shield 35 on the bottom surface of the circuit board 8 provided with a conductive grid of a cross-hatched pattern of 0.010 inches wide traces separated by 0.010 inches spaces. The grid is referenced to ground, and provides electrical shielding and substantial noise reduction. The grid is preferred over a solid shield, since the mass of the conductive shield will inhibit heat transfer that is necessary for attaining solder flow during solder connection of the circuit components 2, 10, 18, 25, 28a, 28b and the pins 33 of the connector 30 to the conductive circuit paths on the circuit board 8 and the plating lined holes 13, 15 22 through the circuit board 8. The shield 35 on the bottom surface of the circuit board 8 augments the shielding effect of the circumscribing circuit path 17 on the opposite side of the circuit board 8, whereby both sides of the circuit board 8 provides for shielding of the circuit comprising the terminator 1 from unwanted emanations of electrical energy. The two, noise reduction capacitors 28a, 28b efficiently distribute active noise reduction over the length of the circuit path 17.

What is claimed is:
1. A line terminator comprising:
   a circuit board having at least three circuits and being provided with a voltage regulator combined with a voltage divider circuit and a noise reduction circuit having a circuit path generally circumscribing remaining circuits of the circuit board and coupled to two spaced apart high frequency capacitors, and the path length is apportioned to extend equally between the pair of spaced apart high frequency capacitors, whereby high frequency noise and voltage spikes are shunted to ground.

2. A line terminator as recited in claim 1 wherein, the circuit path circumscribes the voltage divider circuit.

3. A line terminator as recited in claim 1, and further comprising: a conductive shield on the bottom surface of the circuit board provided with a conductive grid.

4. A line terminator as recited in claim 1 wherein, the circuit path of the noise reduction circuit is referenced to V-out of the voltage regulator, and the pair of spaced apart capacitors are connected between the circuit path and ground.

5. A line terminator as recited in claim 1 and further comprising: a ground electrical path bridging between opposite sides of the circuit path, and the capacitors being connected between the ground electrical path and respective opposite sides of the circuit path.

6. A line terminator as recited in claim 1, and further comprising a low frequency capacitor for shunting low frequency noise to ground.

7. A line terminator as recited in claim 1, and further comprising a low frequency capacitor for shunting low frequency noise to ground.

8. A line terminator comprising:

a voltage regulator, and a voltage divider circuit on a circuit board having at least three circuits, both said voltage regulator and said voltage divider circuit being coupled to a circuit path supplying input voltage from the voltage regulator, wherein the circuit path extends on the circuit board generally circumscribing remaining circuits of the circuit board and is apportioned to extend equally between a pair of spaced apart high frequency capacitors, and the high frequency capacitors are connected between the circuit path and ground, whereby high frequency noise and voltage spikes are shunted to ground.

9. A line terminator as recited in claim 8 wherein, the circuit path circumscribes the voltage divider circuit.

10. A line terminator as recited in claim 8 wherein, the circuit path circumscribes the voltage regulator.

11. A line terminator as recited in claim 8 wherein, the circuit path of the noise reduction circuit is referenced to V-out of the voltage regulator, and the pair of spaced apart capacitors are connected between the circuit path and ground.

12. A line terminator as recited in claim 8 wherein, the circuit path of the noise reduction circuit is referenced to V-out of the voltage regulator, and the pair of spaced apart capacitors are connected between the circuit path and ground.

13. A line terminator as recited in claim 8 and further comprising: an electrical connector, electrical contacts in the electrical connector connected to respective plating lined holes through a circuit board, multiple resistors in the voltage divider circuit, the resistors being connected between V-out of the voltage regulator respective plating lined holes through the circuit board, and a conductive shield on a bottom surface of the circuit board provided with a conductive grid.

14. A line terminator as recited in claim 8 and further comprising: a ground electrical path bridging between opposite sides of the circuit path, and the capacitors being connected between the ground electrical path and respective opposite sides of the circuit path.

15. An assembly of a circuit board and an electrical connector, comprising:

a circuit board having at least three circuits and being provided with a voltage regulator combined with a voltage divider circuit and a noise reduction circuit having a circuit path generally circumscribing remaining circuits of the circuit board and coupled to two spaced apart high frequency capacitors, and the path length is apportioned to extend between the pair of spaced apart high frequency capacitors; and an electrical connector on the circuit board, electrical contacts in the electrical connector connected to respective plating lined holes through the circuit board, multiple resistors in the voltage divider circuit, the resistors being connected between V-out of the voltage regulator and respective plating lined holes through the circuit board, whereby high frequency noise and voltage spikes are shunted to ground.

16. An assembly as set forth in claim 15, and further comprising a low frequency capacitor for shunting low frequency noise to ground.

17. A line terminator as recited in claim 15 wherein, the circuit path circumscribes the plating lined holes through the circuit board.

18. A line terminator as recited in claim 17 wherein, the circuit path of the noise reduction circuit is referenced to V-out of the voltage regulator, and the pair of spaced apart capacitors are connected between the circuit path and ground.

19. An assembly of a circuit board and an electrical connector, comprising:

a voltage regulator, and a voltage divider circuit on a circuit board having at least three circuits, both said voltage regulator and said voltage divider circuit being coupled to a circuit path supplying voltage from the voltage regulator, wherein the circuit path extends on the circuit board generally circumscribing remaining circuits of the circuit board and is apportioned to extend equally between a pair of spaced apart high frequency capacitors, and the high frequency capacitors are connected between the circuit path and ground; and an electrical connector, electrical contacts in the electrical connector connected to respective plating lined holes through the circuit board, multiple resistors in the voltage divider circuit, the resistors being connected between V-out of the voltage regulator and respective plating lined holes through the circuit board, whereby high frequency noise and voltage spikes are shunted to ground.

20. An assembly as set forth in claim 19, and further comprising a low frequency capacitor for shunting low frequency noise to ground.

21. A line terminator as recited in claim 19 wherein, the circuit path circumscribes the plating lined holes through the circuit board.

* * * * *